United States Patent
Laackmann et al.

(10) Patent No.: US 7,077,331 B2
(45) Date of Patent: Jul. 18, 2006

(54) CHIP CARD HAVING A PROJECTION MIRROR

(75) Inventors: Peter Laackmann, Munich (DE); Stefan Rueping, Lengdorf (DE)

(73) Assignee: Infineon Technologies AG, Munich (DE)

( * ) Notice: Subject to any disclaimer, the term of this patent is extended or adjusted under 35 U.S.C. 154(b) by 73 days.

(21) Appl. No.: 10/774,348

(22) Filed: Feb. 5, 2004

(65) Prior Publication Data

US 2004/0222505 A1    Nov. 11, 2004

Related U.S. Application Data

(63) Continuation of application No. PCT/EP02/08089, filed on Jul. 19, 2002.

(30) Foreign Application Priority Data

Aug. 9, 2001  (DE)  ................ 101 39 063

(51) Int. Cl.
*G06K 19/06* (2006.01)
(52) U.S. Cl. ........................................ 235/492
(58) Field of Classification Search ........... 235/492, 235/380, 472.02
See application file for complete search history.

(56) References Cited

U.S. PATENT DOCUMENTS

| | | | |
|---|---|---|---|
| 4,783,598 A | 11/1988 | McAdams, Jr. | |
| 5,734,154 A * | 3/1998 | Jachimowicz et al. | 235/492 |
| 5,763,862 A * | 6/1998 | Jachimowicz et al. | 235/380 |
| 5,793,032 A * | 8/1998 | Bard et al. | 235/472.02 |

FOREIGN PATENT DOCUMENTS

| | | |
|---|---|---|
| EP | 0 498 582 A2 | 1/1992 |
| EP | 0 508 100 A2 | 3/1992 |
| EP | 1 168 231 A2 | 1/2002 |

* cited by examiner

*Primary Examiner*—Karl D. Frech
*Assistant Examiner*—Lisa M. Caputo
(74) *Attorney, Agent, or Firm*—Dickstein, Shapiro, Morin & Oshinsky, LLP.

(57) ABSTRACT

A chip card for generating an image projection includes a substrate, a mirror which is held movable with reference to the substrate, an actuator for moving the mirror with reference to the substrate and a processor for processing image information for driving the actuator in order to move the mirror according to the image information, in order to generate the image projection.

18 Claims, 3 Drawing Sheets

CHIP CARD HAVING A PROJECTION MIRROR

This application is a continuation of International Patent Application No. PCT/EP02/08089, filed Jul. 19, 2002, which published in German on Feb. 20, 2003 as WO 03/015022 A1.

BACKGROUND OF THE INVENTION

1. Field of the Invention

The present invention relates to a chip card and in particular to a chip card having an integrated moveable mirror.

2. Description of the Related Art

Chip cards continuously gain currency with numerous applications, for example as telephone cards for public telephones or as a payment means in the form of EC cards (electronic cash cards) or payment cards. At that, it is desirable in many applications that information which is stored on the chip card, for example a balance on a payment card, may be shown to a user. The optical output of text, data or graphics by a chip card itself is today limited to indications or displays, respectively, laminated into the card, for example liquid crystal displays. These are still very small in order to guarantee a sufficient mechanical stability, whereby a reproduction of more complex texts or graphics is almost impossible. It is conceivable that in future the overall surface of the chip card will be provided with a display foil or indication foil, respectively. Also in this case the reproduction face is always reduced to the ISO format of the chip card, however.

A further important aspect in the illustration of information which is stored on the chip card is the security against a manipulation of data. If information leaves the chip card controller, it needs to be protected against manipulations.

SUMMARY OF THE INVENTION

It is the object of the present invention to provide an improved chip card and an improved chip card read out device for a chip card with the use of which an image may be illustrated.

In accordance with a first aspect, the present invention provides a chip card for generating a two-dimensional image projection, having a substrate, a mirror, which is held rotationally moveable around two axes with reference to the substrate, an actuator for moving the mirror with reference to the substrate around the two axes, and a processor for processing image information for driving the actuator in order to move the mirror rotationally around the two axes according to the image information in order to generate the two-dimensional image projection.

In accordance with a second aspect, the present invention provides a chip card reading device, having a chip card holding means, and a light source holding means for holding a light source generating a light beam, wherein the chip card holding means and the light source holding means are arranged so that the light beam may fall onto a mirror of a chip card when the chip card is held within the chip card holding means, and that a light beam reflected by the mirror may fall onto a projection face, wherein the chip card holding means is further implemented so that it may hold the chip card so that the mirror is visible from the outside.

According to the present invention, a chip card for generating an image projection includes a substrate, a mirror which is moveably held which reference to the substrate, an actuator for moving the mirror with regard to the substrate and a processor for processing image information for driving the actuator in order to move the mirror according to the image information in order to generate the image projection.

Preferably, the actuator is mounted to the substrate, and further the mirror is preferably attached at or in the chip card so that it is not visible from the outside. Further, a chip card according to the present invention preferably comprises a memory and/or an input for image information.

Further, a chip card according to the present invention may comprise a controllable light shutter which is arranged in a light path along which a light beam may propagate which impinges on the mirror and is reflected from there. Alternatively or additionally the chip card may comprise an electrical contact via which the chip card is connectable to a light source, wherein the processor is further provided to apply a light source control signal to the electrical contact.

Preferably, the mirror of the chip card faces a surface of the chip card, on which the chip card comprises no electrical contacts.

According to the present invention, a chip card reading device includes a chip card holding means and a light source holding means for holding a light source which generates a light beam, wherein the chip card holding means and the light source holding means are arranged so that the light beam may fall onto a mirror of a chip card when the chip card is held within the chip card holding means and that a light beam reflected from the mirror may fall onto any projection face which may be part of the chip card reading device.

The chip card holding means of the inventive chip card reading device may be implemented so that it can hold the chip card such that the mirror of the chip card is visible from the outside. For this the chip card holding means may for example comprise a slot which takes up the chip card only so far that the mirror is visible from the outside.

In the inventive chip card reading device, the chip card holding means and the light source holding means are preferably implemented so that the chip card holding means may hold the chip card and the light source holding means may hold the light source so that an angle between the light beam and the mirror greater than 0 degrees and smaller than 90 degrees is present, wherein the angle is preferably 45 degrees.

Preferably, the light source is a laser or a laser pointer. The chip card holding means and the light source holding means are preferably implemented so that light source holding means may accept the light source so that the light beam is not interfered with by the chip card holding means when no chip card is inserted into the chip card holding means.

According to a preferred embodiment of the present invention, the chip card reading device further comprises a diode laser which is held by the light source holding means, and the light source holding means comprises a hinge via which the chip card holding means and the diode laser are movably connected to each other.

According to a further preferred embodiment of the present invention, the chip card reading device is implemented as a chip card terminal and includes a light source which is held by the light source holding means, a means for determining whether the chip card is admitted for the chip card reading device and a means for enabling or switching on the light source, respectively.

In other words, the present invention describes a chip card comprising an integrated laser projector. On the chip card controller a micromechanically moveable mirror is integrated which may deflect an incoming laser beam having a high frequency in order to project text, data or graphics onto any projection face using the deflected laser beam.

The projection face may thereby be some square meters large and may either be provided for example in the form of a projection screen in a chip card reading device in itself or it may be an arbitrary face which is mainly provided for other purposes, for example a sheet of paper or a wall of a room.

One advantage of the inventive chip card is, that the mirror may be substantially smaller than a projection of text, data or graphics generated by the same onto a projection face. In particular, the mirror may be so small so that it may easily be protected from a mechanical damage or destruction and that a manipulation is much more difficult.

A further advantage of the present invention is that the mirror may be manufactured cost-effectively as a micromechanical member or as a microactuator, respectively, as a semiconductor device and may further be integrated with the chip card controller or the processor, respectively, of the chip card. An integral implementation of the mirror with the actuator and the processor offers a further substantial improvement of safety from manipulation.

A special advantage of the present invention is that the microcontroller or processor, respectively, of the chip card implements the data/graphics projections itself, so that a corruption of the output data is extremely difficult. An especially secured terminal is not necessary. A very simple arrangement of a conventional diode laser, as it is for example used for a laser pointer, may be used together with a very cost-effective chip card reading device. It is obvious for a user that the illustrated output in the form of the projected text or the projected graphics is not generated by the terminal but directly by the chip card. The output is therefore especially trustworthy and the use of an expensive manipulation-safe terminal may be renounced.

An inventive chip card terminal may comprise a diode laser which may be modulated. The chip card terminal may mechanically hold a chip card, provide the same with electrical power and further provides a laser beam with the help of the diode laser which may be modulated, wherein the same may be digitally modulated and deflected by the chip card. For a modulation the laser beam may either be switched on or off by the input/output contact (I/O contact) of the chip card or the laser beam is faded out on the chip card by a light shutter, e.g. in the form of a liquid crystal shutter (LCD shutter; LCD=liquid crystal display) prior to the mirror system. For this, a simple modification of a conventional presentation laser pointer is sufficient.

BRIEF DESCRIPTION OF THE DRAWINGS

In the following, preferred embodiments of the present invention are explained in more detail with reference to the accompanying drawings, in which.

DESCRIPTION OF THE PREFERRED EMBODIMENTS

Figure 1:
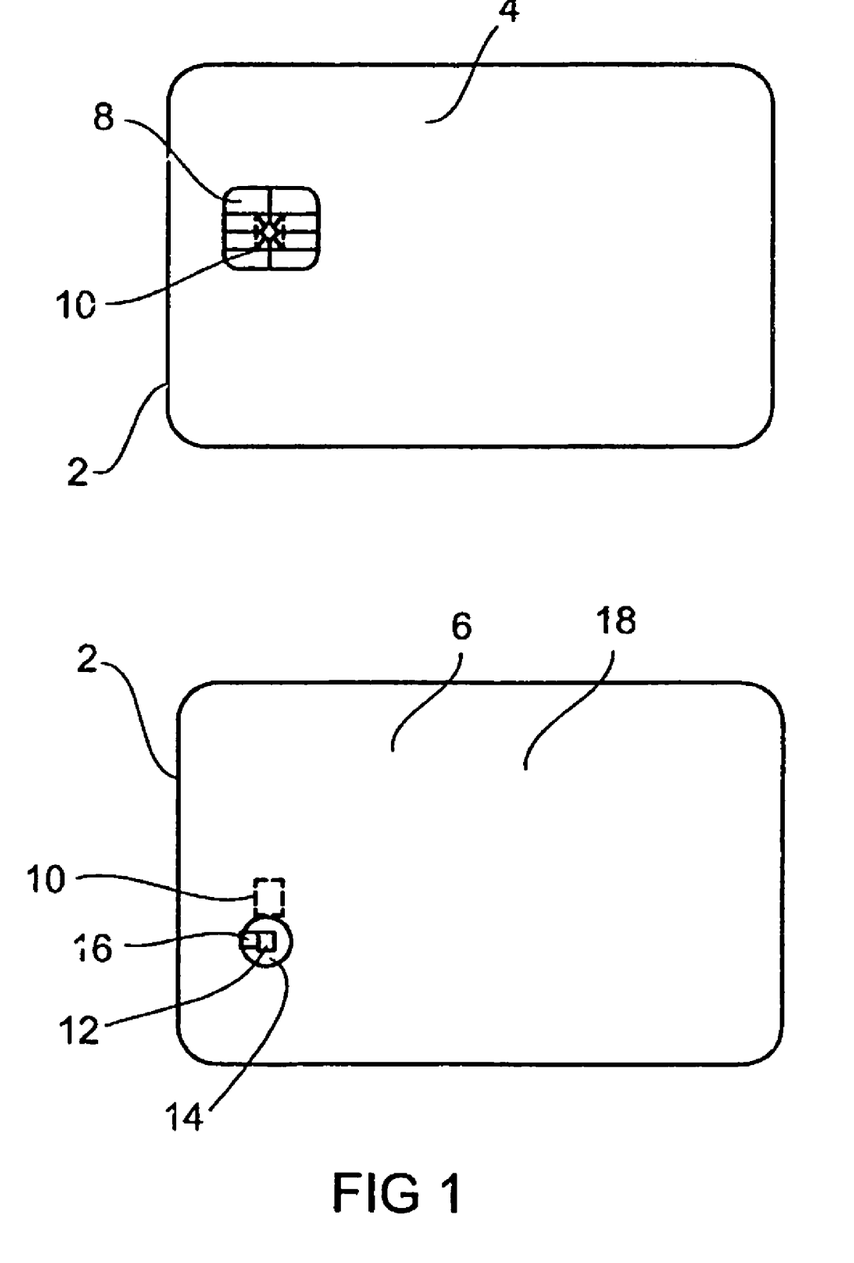
FIG. 1 shows a schematic illustration of a preferred embodiment of a chip card according to the present invention.

FIG. 1 is a schematic illustration of a chip card 2 according to a preferred embodiment of the present invention. The chip card 2 comprises a first surface 4 whose top view is illustrated in the upper part of FIG. 1, and a second surface 6, whose top view is illustrated in the lower part of FIG. 1. On the first surface 4 the chip card 2 comprises a plurality of electrically conductive contact faces 8 which are electrically connected to a lower processor, i.e. the processor 1,0 arranged between the first surface 4 and the second surface 6 of the chip card 2, whose outlines are illustrated in dashed lines in FIG. 1. Further, the chip card 2 comprises a mirror 12 which is arranged laterally adjacent to the processor 10 between the first surface 4 and the second surface 6 of the chip card 2 and which is rotationally moveable around two axes. The second surface 6 comprises an opening 14 closed mechanically by a transparent window in the area of the mirror 12. An actuator 16 is on the one hand connected mechanically to the mirror 12 and on the one hand to the substrate 18, and is electrically connected to the processor 10.

The electrically conductive contact faces 8 serve as an electrical interface of the processor 10 via which the processor may be provided with electrical power from the outside, for example from a chip card reading device or a terminal, and via which data may be exchanged between the processor and the chip card reading device or the terminal, respectively. The actuator 16 is electrically controllable by the processor 10 in order to move the mirror 12 with respect to the substrate 18 of the chip card 2. Apart from the functions implemented in conventional chip cards, for example for an authentication of the chip card or a user of the chip card or a storage of data, the processor 10 of the chip card 2 according to the present invention comprises functions for processing image information and for driving the actuator 16 in order to move the mirror 12 according to the image information in order to generate an illustration of text, graphics or other types of data by a projection of a light beam onto a projection face caused by the mirror 12. Details of the projection are explained in more detail with reference to FIG. 2.

Figure 2:
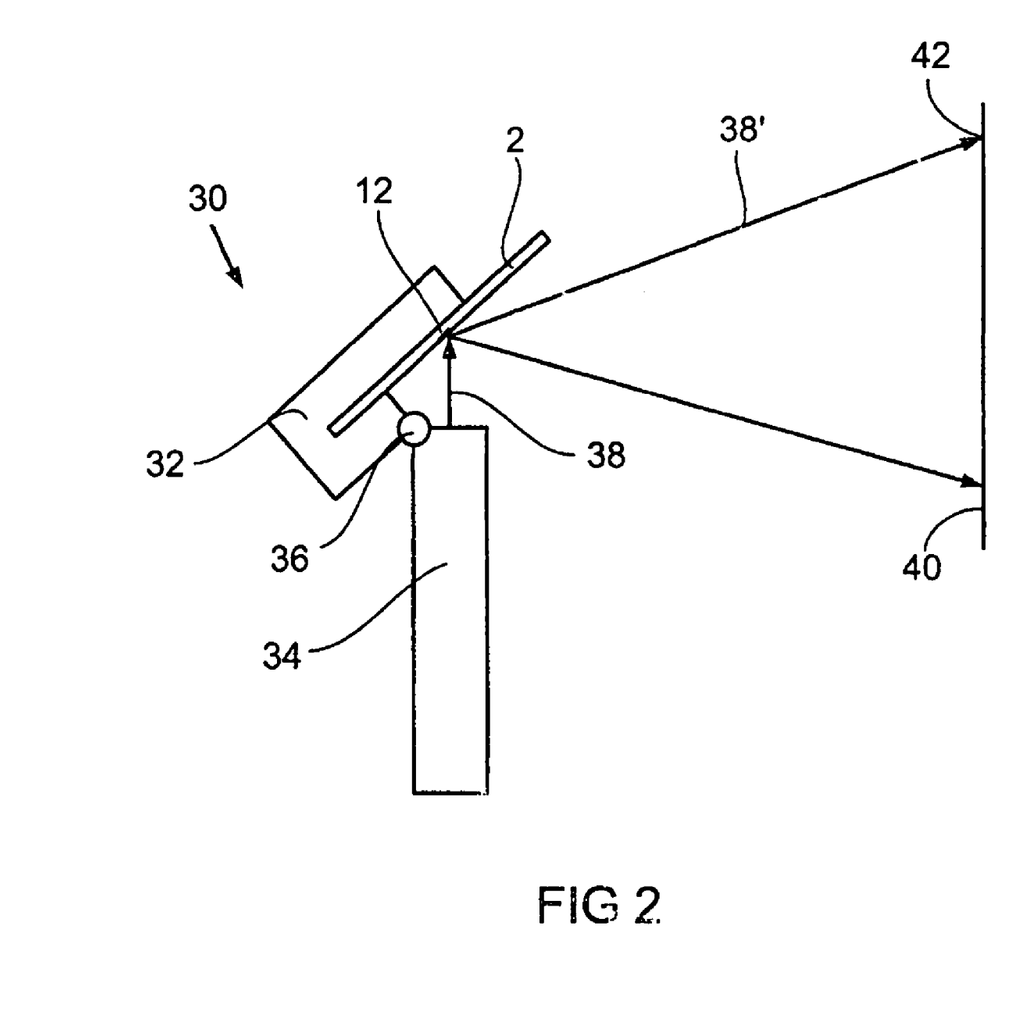
FIG. 2 shows a schematic illustration of the preferred embodiment of a chip card reading device according to the present implementation.

FIG. 2 is a schematic illustration of a chip card reading device 30 according to a preferred embodiment of the present invention. The chip card reading device 30 includes a chip card holding means 32 which is implemented so that 10 it may mechanically hold the chip card 2 and a laser 34 which is hingedly connected to a chip card holding means 32 via a hinge 36.

The chip card holding means 32 is implemented so that it may mechanically hold a chip card 2, as it is illustrated in FIG. 1, and may provide the same with electrical power via its contact faces 8. The laser 34 may generate a light beam 38, wherein the chip card holding means 32 and the laser 34 are aligned to each other using the hinge 36 so that the light beam 38 of the laser 34 falls onto the mirror 12 of the chip card 2 when the same is inserted into the chip card holding means 32. The hinge 36 preferably comprises an arresting means for this purpose, which is not illustrated, using which the chip card holding means 32 and the laser 34 may be fixed to each other in a desired angle. In this case, the mirror 12 deflects the light beam 38 or reflects the same, respectively. The direction of the deflected or reflected light beam 38', respectively, is thereby dependent on the arrangement of the mirror 12, which may in turn be changed by the processor 10 controlled by the actuator 16 of the chip card 2. A user may hold the chip card reading device 30 in his hand and arrange the same opposing to a projection face 40 which may seem appropriate to him, for example a sheet of paper or a house wall, so that the deflected light beam 38' generates a visible light point 42 on the projection face 40.

For illustrating data in the form of text or graphics the processor 10 controls the actuator 16 so that the mirror 12 rotationally moves to and fro with a high frequency around two axes. Accordingly, the direction of the light beam 38' deflected by the mirror 12 and the location of the light point on the projection face 40 by the deflected light beam 38 changes. By a repeated movement of the light points 42 over the projection face 40 with a sufficient frequency, for example 20 Hz, for the human observer, for example the user of the chip card reading device 30, the impression of an image results.

Here, there are several possibilities to generate the light points 42 so that an image results. When the laser 34 continuously emits a light beam 38, the mirror 12 may be controlled by the processor 10 so that the deflected light beam 38' hits the projection face 40 only at these locations or only at the locations, for a time which is substantial for the human eye, at which a visible light point 42 is to appear, wherein the mirror 12 is moved so that the deflected light beam 38' either bypasses image faces on the projection face 40 which are to appear darkened or sweeps the same very fast. This way of generating an overall image which seems to be stationary or slowly moving to the human eye is similar to those in an old analog oscilloscope in which an electron beam deflected by electrical or magnetical fields quickly repeatedly describes exactly those areas of an image face of a Braun valve which are to appear light to an observer.

Alternatively, in the chip card 2 at the second surface 6 in the area of the mirror 12 a light shutter may be arranged which is controllable by the processor 10, for example a liquid crystal shutter (LCD shutter; LCD=liquid crystal display). In this case, the deflected light beam 38' which is directed by the mirror 12 scans the projection face 40 preferably in rows, similar to the way an electron beam of a television cathode-ray tube describes the image face. Using the light shutter the processor 10 may face out the light beam 38 before the reflection at the mirror 12 and/or the deflected light beam 38' after the reflection at the mirror 12 in order to generate dark image areas on the projection face 40.

A further alternative is for the processor 10 to control the light emission of the laser 34. This is preferably performed using a light source control signal which the processor 10 of the chip card 2 generates and applies to one of the contact faces 8 of the chip card 2, wherein the chip card holding means 32 taps the light source control signal of this contact face 8 and feeds it to the laser 34 in order to control its light emission, for example by switching its power supply on and off. Similar to the image generation method described above, the mirror 12 is controlled by the processor 10 also in this case so that the light beam 38' deflected from the mirror 12 sweeps the whole image face on the projection face 40 row by row, so that for a human observer the impression of a homogenously lit face results when the light emission of the laser 34 is not modulated. By switching off or reducing the light emission of the laser 34 controlled by the processor 10 dark image areas may be generated onto which the deflected light beam 38 does not impinge or only with a low intensity.

Preferably, the chip card reading device 30 or the chip card holding means 32 are implemented so, that the light beam 38 is not affected, i.e. deflected, scattered or attenuated, when no chip card 2 is inserted in the chip card holding means 32. For this the chip card holding means 32 for example comprises a recess in the area of the propagation direction of the light beam 38 through which the light beam 38 may pass unhindered. Further, the chip card reading device 30 may be implemented so that the chip card holding means 32 may be hinged to the light output of the laser 34 when no chip card 2 is inserted into the chip card holding means, so that the chip card reading device 30 for example approximately takes on the form of a pin. Even in this shut state of the chip card reading device 30 the light beam 38 of the laser 34 may exit the chip card reading device 30 unhindered when a corresponding opening or a corresponding light channel, respectively, is provided in the chip card holding means 32. In both described implementation variations of the chip card reading device 30 the same is useable as a laser pointer when no chip card 2 is inserted into the chip card holding means 32.

A further variance of the chip card reading device 30 only comprises a light source holding means instead of the laser 34, using which a laser pointer may temporarily be attached to the chip card holding means 32 while the chip card reading device 30 is used as such. The chip card reading device 30 is in this case an attachment for the laser pointer, using which the laser pointer may be used for illustrating information which is stored on a chip card. As the attachment does not need to comprise further functional elements apart from a mechanical holder and a simple power supply for the chip card 2, it may be small and very cost-effective and still allow a comfortable and manipulation-secure reading out of information which is stored on the chip card. As by a chip card 2 inserted into the chip card holding means 32 text, graphics or other data, which is stored on the chip card 2 or was generated by the same, were illustrated by the projection onto the projection face 40, the laser pointer may be taken off the light source holding means again in order to serve as a usual pointing instrument. The hinge 36 may for example be implemented as a light source holding means so that a laser pointer may removably be mounted to the same.

Preferably, the chip card reading device 30, similar to the way it is illustrated in FIG. 2, is implemented so that the light path from the laser 34 via the mirror 12 of the chip card 2 is visible to a user. A user of the chip card reading device 30 may therefore convince himself anytime by examination that the image projected onto a projection face 40 is only generated by the chip card 2 and not manipulated by the chip card reading device 30.

Figure 3:
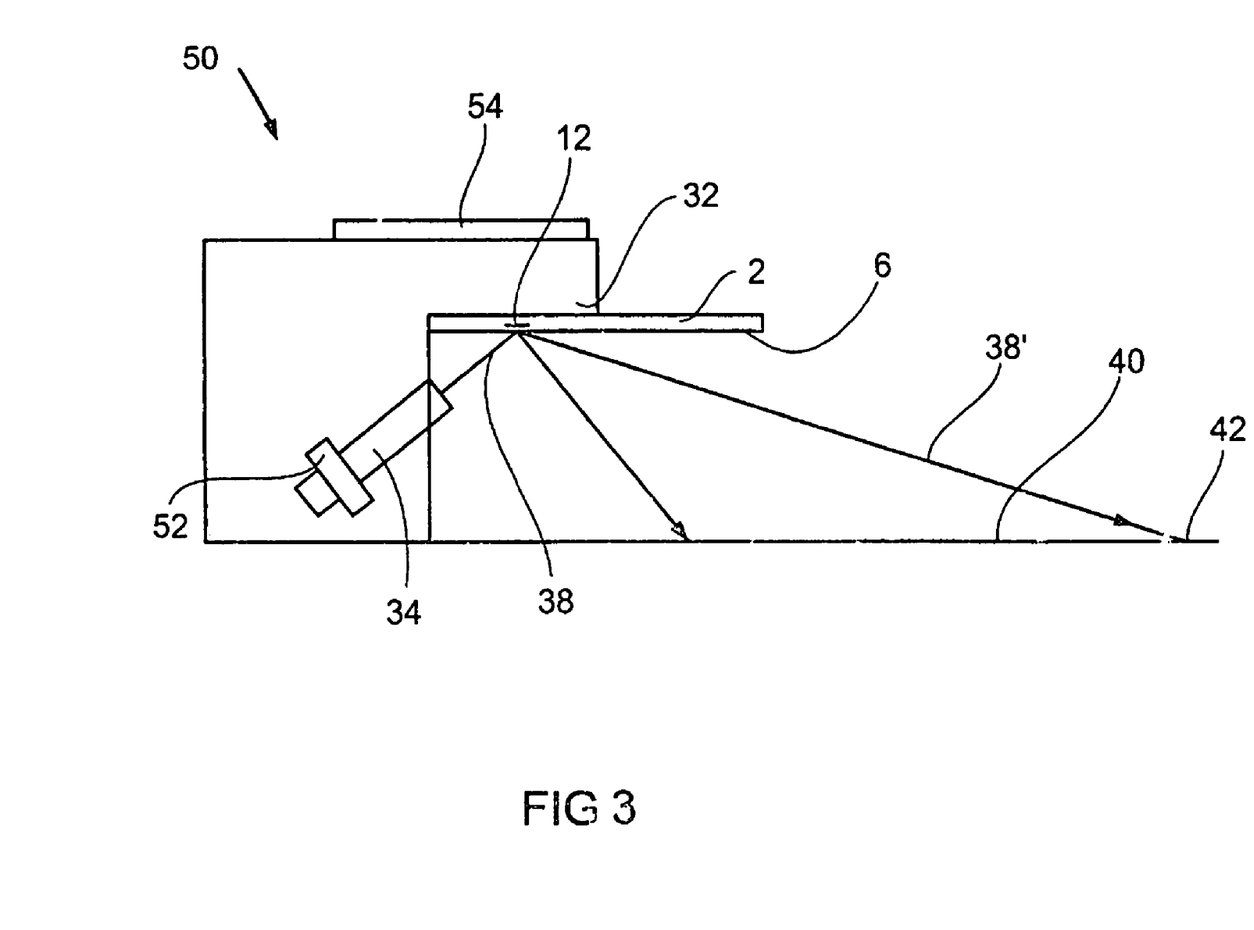
FIG. 3 shows a schematic illustration of a further preferred embodiment of a chip card reading device according to the present invention.

FIG. 3 shows a schematic illustration of a further preferred embodiment of a chip card reading device 50 which is implemented as a chip card terminal. The chip card reading device 50 comprises a chip card holding means 32 and a laser 34 held by a light source holding means 52, which are arranged so that a light beam 38 emitted by the laser 34 impinges on the mirror 12 of a chip card 2 when the same is inserted into the chip card holding means 32 or held by the chip card holding means 32, respectively. The chip card reading device 50 further comprises a projection face 40 which is arranged opposite the second surface 6 of the chip card 2 so that a light beam 381 deflected by the mirror 12 of the chip card 2 generates a light point 42 on the projection face 40. Further, the chip card reading device 50 comprises a keyboard 54 via which a user may input data in the form of characters or numbers, which may serve for controlling the chip card reading device 50 or may be transmitted to the processor 10 of the chip card 2 via the contact face 8 of the chip card 2 in order to for example authenticate the user using a pin number to be input by the same into the chip card 2 or to select a function of the chip card 2. A chip card 2 held by the chip card holding means 32, like in the above illustrated embodiment with reference to FIG. 2, may generate an image on the projection face 40 which transmits information to the user in the form of text and/or graphics.

Also the chip card reading device 50 is preferably implemented so that the light path from the laser 34 via the mirror 12 of the chip card 2 to the projection face 40 and in particular the mirror 12 of the chip card are visible for the user so that the user may convince himself any time that the image projected onto the projection face 40 was generated by the chip card 2 and is not manipulated by the chip card reading device 50.

The projection face 40 may, as it was described above, be part of the chip card reading device 50, or similar to the embodiment illustrated in FIG. 2 be any face selected by the user of the chip card reading device 50, for example a surface of a table, a wall or a sheet of paper.

While the chip card reading device 30 of FIG. 2 is preferably only provided for reading or illustrating, respectively, data stored on the chip card 2 and therefore does not comprise an additional user interface in the form of a keyboard or a display and also no interface to a computer or a computer network, the chip card reading device 50 of FIG. 3 is implemented with the keyboard 54 via which the user may input commands or data in order to control the chip card reading device 50 and/or the chip card 2 or store data in the same. Further, the chip card reading device 50, as well as the chip card reading device 30 of FIG. 2, comprises an interface to a computer or a computer network. The chip card reading device 50 may be implemented as a terminal with all those functions that a conventional terminal comprises or provides to a user. Apart from that, it has the advantage, however, that a user may convince himself anytime that text or graphics illustrated on the projection face 40 are generated by the chip card 2, i.e. that the chip card reading device 50 does not simulate wrong facts.

Further, the chip card reading device 50 of FIG. 3 may comprise a means for determining, whether a chip card 2 inserted into the chip card holding means 32 is admitted for the chip card reading device 50, and a means for enabling the laser. When a user inserts a chip card 2 into the chip card reading device 50 or the chip card holding means 32, respectively, whose data he wants to see or whose functions, e.g. whose money card functions, he wants to use, the means for determining whether the chip card 2 is admitted for the chip card reading device first determines whether the chip card 2 is admitted for the chip card reading device 50. The means for enabling the laser 34 only enables the same when the chip card 2 is admitted for the chip card reading device 50. Means for enabling the laser 34 may enable the laser by switching on the power supply of the laser 34, opening an aperture in the optical path of the laser or directing the laser beam of the laser 34 to the mirror 12 of the chip card 2 using a controllable coupling mirror or by facilitating a control of the power supply, the aperture or the coupling mirror by the chip card. Thereby for example a misuse of the chip card reading device 50 may be prevented.

Deviating from the embodiments illustrated in FIGS. 2 and 3, a chip card reading device may also be implemented so, however, that the light path from the laser 34 via the mirror 12 of the chip card 2 to the projection face 40 is only partially or not visible at all for the user. Further, in the light path optical elements, like lenses or plane or curved mirrors may be arranged in order to redirect, focus, expand, etc. the light beam 38 or the deflected light beam 38' in order to enlarge the projection, direct the same into another direction or improve its quality. Further, instead of the laser 34 another light source may be used, for example an arc or a coiled filament. A laser, however, has the advantage that it emits light with a very high intensity and a very low divergence. The light point 42 generated by the light beam 38 deflected by the mirror 12 of the chip card 2 on the projection face 40 is therefore also light and approximately point-shaped also with a great distance between the mirror 12 of the chip card 2 and the projection face 40, so that on the projection face 40 a light and well visible image for the user results without focusing optics in the form of lenses and/or concave mirrors being required. An angle between the light beam 38 and the mirror 12 of the chip card 2 is preferably greater than 0 degrees and smaller than 90 degrees, so that the light beam 38 neither grazingly falls onto the mirror 12 nor is reflected by the same in the laser 34. An especially preferred size of the angle is 45 degrees, as it is also illustrated in FIGS. 2 and 3.

The chip card holding means 32 both of the chip card reading device 30 of FIG. 2 and of the chip card reading device 50 of FIG. 3 may be implemented in a series of ways in order to hold the chip card 2. For example, the chip card holding means 32 may comprise a slot in which the chip card 2 may be inserted partially or completely and which is implemented so that the light beam 38 of the laser 34 may fall onto the mirror 12 and the light beam 38' deflected by the mirror 12 may exit the chip card holding means 32 in order to fall onto the projection face 40. For this, the chip card holding means 32 may comprise an opening or a window covered by a material permeable to light emitted by the laser 34 in the area in which the mirror 12 of the chip card 2 is arranged when the chip card 2 is inserted into the chip card holding means 32. Other embodiments of the chip card holding means 32 may comprise mechanical clamps, a suction means or a magnet for holding the chip card 2 using underpressure or a magnetic field, respectively, while these may for example be implemented so that the second surface 6 of the chip card 2 is completely open and uncovered when the chip card 2 is held by the chip card holding means 32. Preferably, the chip card holding means 32 is implemented using one or several mechanical guides or stops, respectively, for the chip card 2 so that a chip card 2 takes the same defined position with every insertion into the chip card holding means 32, so that the mirror 12 always comes to lie at the same location and the light beam 38 may hit the mirror 12.

In the chip card reading device 30 the chip card holding means 32 and the laser 34 may be connected to each other by a rigid member instead of the hinge 36.

The chip card 2, as it is illustrated in FIG. 1, may comprise the contact faces 8 at a first surface 4 and the mirror 12 below a second surface 6 between the first surface 4 and second surface 6, so that the mirror is facing the second surface 6 and a light beam which falls through a opening in the second surface 6 onto the mirror 12 is deflected by the same so that it leaves the chip card again through the same opening or through a further opening in the second surface 6. Instead, however, also the contact faces 8 may be arranged at the same surface which the mirror 12 in the chip card is facing. Further, a completely different light path within the chip card 2 is possible, wherein for example the light beam 38 falls through the opening 14 in the second surface 6 onto the mirror 12 and is deflected by the same so that the deflected light beam 38' exits through a first surface 4. Further, the chip card 2 may comprise further optical members, for example a further mirror, a lens or an optical waveguide using which the light beam 38 is redirected, focused, expanded or directed to another location within the chip card 2 prior to or after its deflection by the mirror 12. Here, the mirror 12 is preferably arranged between the first surface 4 and the second surface 6 of the chip card 2, as it may thereby be easily protected from mechanical damages by exterior influences. The mirror 12 may, however, also be arranged basically in a coplanar way with a surface of the chip card 2 or outside the chip card 2.

The mirror 12 and the processor 10 may arbitrarily be arranged within the chip card 2, wherein an electrical connection between the processor 10 and the actuator 16 and a mechanical connection between the actuator 16 and the mirror 12 is present, so that the processor 10 may move the mirror 12. As all kinds of electrical lines offer a possibility for manipulation, the processor 10, the actuator 16 and the mirror 12 are preferably arranged in close proximity to each other or in particular preferably on a single semiconductor chip. The processor 10, the actuator 16 and the mirror 12, as it is illustrated in FIG. 1, may be laterally adjacent to each other or may be arranged in the form of a sandwich or a stack between the first surface 4 and the second surface 6 of the chip card 2.

The actuator 16 may for example be an electrostatical or a piezoelectrical actuator, wherein the mirror 12 is preferably rotatable or pivotable around two axes, in order to facilitate a variable diffraction of the light beam 38 in two directions perpendicular to each other and so enable the creation of a two-dimensional image.

Instead of the contact faces 8 illustrated in FIG. 1 the chip card 2 may comprise a contactless interface using which the chip card 2 or the processor 10, respectively, are provided with power and data to and from the chip card 2 or its processor 10, respectively, may be transmitted. In the case of the galvanic interface illustrated in FIG. 1 using the contact faces 8 the same are preferably arranged at the first surface 4 which faces away from the second surface 6 comprising the opening 14 that the mirror 12 is facing.

The chip card 2 may comprise a memory and/or an input for image information which may be part of the processor 10, so that an image projected by the processor 10 using the actuator 16 and the mirror 12 may comprise image information which are stored only or partially on the chip card 2 or within the processor 10, respectively, or are for example transmitted from a terminal to the chip card 2 or are formed or calculated by the processor 10 of the chip card 2 both from data transmitted to the chip card 2 from the outside and from data stored within the chip card 2 itself.

Further, the chip card 2 may have its own power supply, for example using a solar cell or a battery, so that an external power supply is not required by the chip card reading device 30 or 50. A chip card reading device for such a chip card 2 must correspondingly provide no power supply for the chip card 2.

Further, the chip card 2 may be implemented without an interface for transmitting data, wherein it is provided only for illustrating information which is stored within the chip card.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. Chip card for generating a two-dimensional image projection, comprising:
   a substrate,
   a mirror, which is held rotationally moveable around two axes with reference to the substrate;
   an actuator for moving the mirror with reference to the substrate around the two axes; and
   a processor for processing image information for driving the actuator in order to move the mirror rotationally around the two axes according to the image information in order to generate the two-dimensional image projection.

2. Chip card according to claim 1, wherein the actuator is mounted to the substrate.

3. Chip card according to claim 1, wherein the mirror is arranged at the chip card so that it is visible from the outside.

4. Chip card according to claim 1, further comprising a memory for image information.

5. Chip card according to claim 1, further comprising an input for image information.

6. Chip card according to claim 1, further comprising a controllable light shutter arranged within a light path along which a light beam may propagate which impinges onto the mirror and is reflected from the same.

7. Chip card according to claim 1, further comprising an electrical contact via which the chip card is connectable to a light source, wherein the processor is further provided to apply a light source control signal to the electrical contact.

8. Chip card according to claim 1, wherein the mirror faces a surface of the chip card on which the chip card comprises no electrical contacts.

9. Chip card according to claim 1, wherein the processor, the actuator and the mirror are implemented integrally.

10. Chip card reading device, comprising:
    a chip card holding means; and
    a light source holding means for holding a light source generating a light beam,
    wherein the chip card holding means and the light source holding means are arranged so that the light beam may fall onto a mirror of a chip card when the chip card is held within the chip card holding means, and that a light beam reflected by the mirror may fall onto a projection face, wherein
    the chip card holding means is further implemented so that it may hold the chip card so that the mirror is visible from the outside.

11. Chip card reading device according to claim 10, wherein the chip card holding means further comprises a slot which accepts the chip card only so far that the mirror is visible from the outside.

12. Chip card reading device according to claim 10, wherein the chip card holding means and the light source holding means are further implemented so that the chip card holding means may hold the chip card and the light source holding means may hold the light source so that an angle between the light beam and the mirror is greater than 0 degrees and smaller than 90 degrees.

13. Chip card reading device according to claim 12 wherein the angle is 45 degrees.

14. Chip card reading device according to claim 10, wherein the light source is a laser.

15. Chip card reading device according to claim 10, wherein the light source is a laser pointer.

16. Chip card reading device according to claim 10, wherein the chip card holding means and the light source holding means are implemented so that the light source holding means may accept the light source so that the light beam is not affected by the chip card holding means when no chip card is inserted.

17. Chip card reading device according to claim 10, further comprising:
a diode laser which is held by the light source holding means,
wherein the light source holding means comprises a hinge via which the chip card holding means and the diode laser are moveably connected to each other.

18. Chip card reading device according to claim 10, which is further implemented as a chip card terminal and further comprises:
a light source held by the light source holding means;
means for determining whether the chip card is admitted for the chip card reading device;
and means for enabling the light source.

* * * * *

UNITED STATES PATENT AND TRADEMARK OFFICE
CERTIFICATE OF CORRECTION

| | | |
|---|---|---|
| PATENT NO. | : 7,077,331 B2 | |
| APPLICATION NO. | : 10/774348 | |
| DATED | : July 18, 2006 | |
| INVENTOR(S) | : Peter Laackmann et al. | |

It is certified that error appears in the above-identified patent and that said Letters Patent is hereby corrected as shown below:

In the Specification:

In Column 1, line 67, replace "which reference" with --with references--

In Column 4, line 48, delete "10"

In Column 8, line 55, replace "...a opening" with --an opening--

In column 9, line 43, replace "...are stored" with --is stored--

Signed and Sealed this

Twelfth Day of December, 2006

JON W. DUDAS
*Director of the United States Patent and Trademark Office*